United States Patent
Kelley et al.

(10) Patent No.: US 12,052,042 B2
(45) Date of Patent: Jul. 30, 2024

(54) CLAM-SHELL MOBILE DEVICE PROTECTOR

(71) Applicant: DROKS Healthcare, L.L.C., Baton Rouge, LA (US)

(72) Inventors: Steven Kelley, Baton Rouge, LA (US); LeKeith Terrell, Newman, GA (US)

(73) Assignee: DROKS Healthcare, L.L.C., Baton Rouge, LA (US)

( * ) Notice: Subject to any disclaimer, the term of this patent is extended or adjusted under 35 U.S.C. 154(b) by 60 days.

(21) Appl. No.: 17/240,472

(22) Filed: Apr. 26, 2021

(65) Prior Publication Data

US 2021/0359713 A1 Nov. 18, 2021

Related U.S. Application Data

(60) Provisional application No. 63/026,190, filed on May 18, 2020.

(51) Int. Cl.
*H04B 1/3888* (2015.01)
(52) U.S. Cl.
CPC ................... *H04B 1/3888* (2013.01)
(58) Field of Classification Search
CPC .................................................. H04B 1/3888
See application file for complete search history.

(56) References Cited

U.S. PATENT DOCUMENTS

| | | | | |
|---|---|---|---|---|
| 2013/0284615 | A1* | 10/2013 | Lee | A45C 11/00 206/45.23 |
| 2015/0122883 | A1* | 5/2015 | Del Toro | G06F 16/955 235/492 |
| 2015/0220766 | A1* | 8/2015 | Russell | G06K 7/10732 235/462.42 |
| 2016/0295173 | A1* | 10/2016 | Gredinger | H04N 9/8042 |
| 2016/0336988 | A1* | 11/2016 | Smith | B32B 37/08 |
| 2017/0055661 | A1* | 3/2017 | Planche | H04B 1/3888 |
| 2017/0201285 | A1* | 7/2017 | Liu | H04B 1/3888 |
| 2017/0266929 | A1* | 9/2017 | Wilson | B32B 7/12 |

* cited by examiner

*Primary Examiner* — Yuwen Pan
*Assistant Examiner* — Fatuma G Sherif
(74) *Attorney, Agent, or Firm* — Seyfarth Shaw LLP; Brian Michaelis

(57) ABSTRACT

A mobile device case including a first section and a second section connected by a transitional section. The mobile device case is configured to provide a peelable, multi-layered case for a mobile device. The mobile device case may include multiple perforated sections to facilitate access to various features of the mobile device. The mobile device case includes multiple layers which may be peeled to remove it from the mobile device case.

15 Claims, 3 Drawing Sheets

CLAM-SHELL MOBILE DEVICE PROTECTOR

TECHNICAL FIELD

The present disclosure generally relates to a device cover or protector, and more particularly to a cover/protector for mobile devices such as cell phones and tablets.

BACKGROUND

Mobile device cases or protectors, such as those for phones and tablets, typically utilize the combination of a transparent screen protector with a hard shell or fabric enclosure. These combination protectors/cases provide protection for the device at the cost of increased bulk and weight. A variety of combination cases currently on the market utilize, at a minimum, a foam shell around the edges of the device/phone. This shell increases the size and weight of the phone, potentially negatively impacting the ability of a user to store and handle their device as designed. Additionally, known cases come with a risk of capturing and retaining pathogens from the environment on surfaces (interior and exterior) of the case and between the case and the device. These previous efforts have resulted in potential contamination vectors for the user.

SUMMARY

The present disclosure generally provides for an adhesive, multi-layered mobile device protector or case. Aspects of the mobile device protector provide a user the ability to protect their phone or tablet from scratches, dings, dents or the like, while providing a way to remove contamination from the device quickly. The system and method allow a user to successively remove a contaminated layer of the mobile device case while maintaining continued protection for the device. While the present disclosure is discussed in regards to phones as an example, it should be understood by one skilled in the art that the present disclosure will function with other types of devices known in the art, such as tablets, as well as other devices of different form factors that may receive a removable cover of adhesive layers that may be successively removed to yield an appropriately transparent protection layer.

According to one aspect, the present disclosure provides a mobile device case protecting a device from scratches and other damage without substantially increasing the size and weight of the device. The mobile device protector may include perforated flaps to facilitate easy installation. The mobile device case may include multiple layers of material, such as plastic or polymeric material, in a laminar structure each layer of which is peelable to separate an outer-most layer from underlying layers. Adhesive is disposed between each polymeric layer in a thickness that results in appropriate adhesion between polymeric layers and as between the first layer and the mobile device. The user may remove a layer of the laminar structure of the mobile device protector when the mobile device case surface becomes contaminated. The mobile device protector's remaining layers continue to protect the device following removal of the outer or topmost layer(s). Tabs may be present in the laminar structure at each polymeric layer providing a grasping mechanism for removing a layer of the mobile device case from the device, without disturbing the underlying layer(s).

According to another aspect, the mobile device protector may feature perforated sections that can be removed to provide access to functions/features of the mobile device. The removable perforated sections may, for example, be present in the area of a power button, volume controls, charging/audio ports, camera(s), and/or the like. Additionally, removable sections may be located in the area of features on the mobile device, such as the speaker, power/volume controls, and the fingerprint sensor or other biometric sensor (if applicable).

The mobile device protector according to the disclosure may be configured to the particular features, and be customized to best fit the device on which it is or is to be installed. That is, various embodiments according to the disclosure may be configured to conform to the feature placements for different makes/models. For example, an embodiment of the disclosure may be configured to protect a model of phone or tablet available from a first manufacturer, while another embodiment may be configured to protect another model or a model or models from a different device manufacturer. Embodiments may be configured for other makes/models without departing from the disclosure.

The above summary has outlined, rather broadly, some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details.

Figure 1:
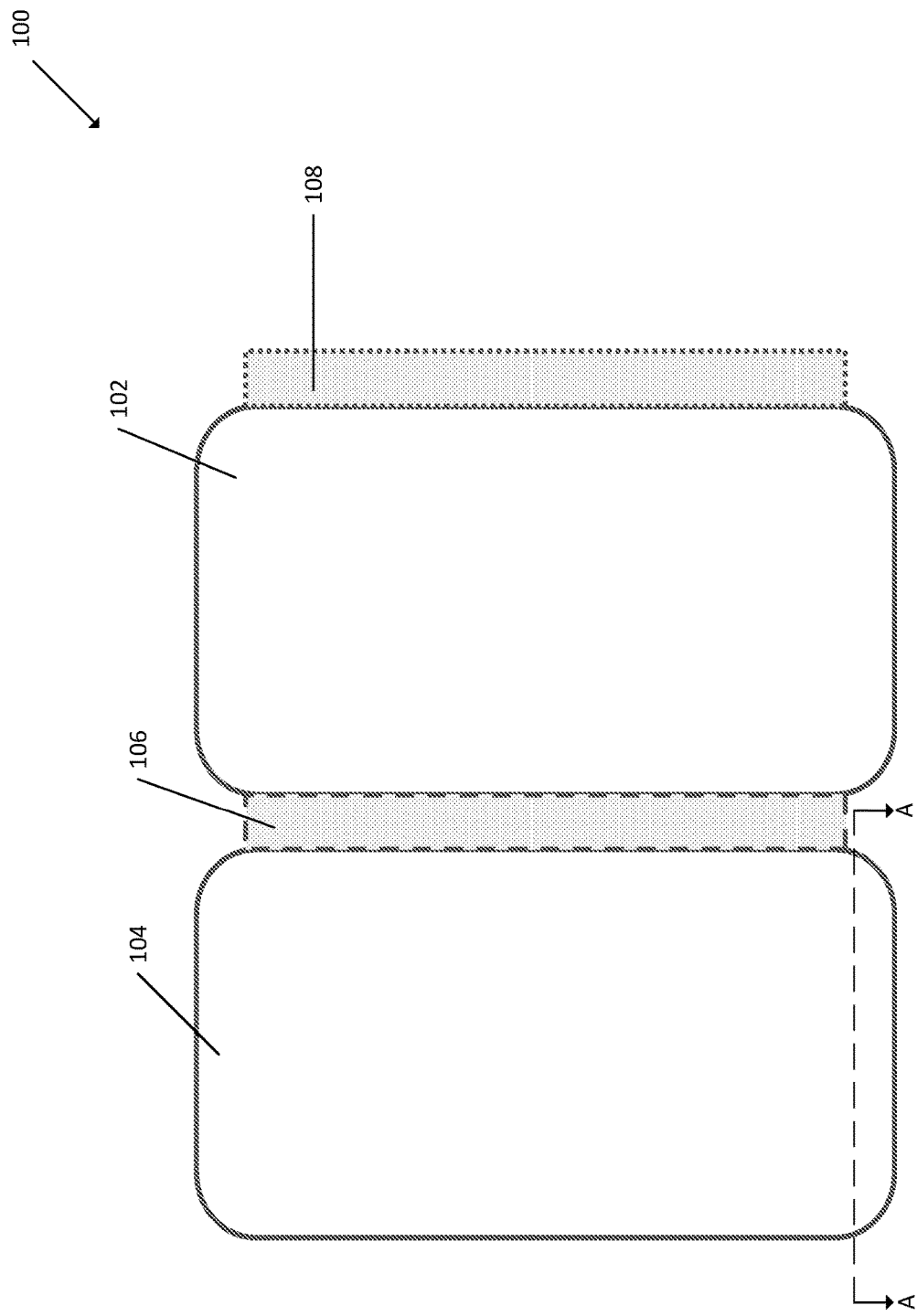
FIG. 1 depicts a first embodiment of a mobile device protector according to an aspect of the present disclosure.

FIG. 1 depicts a first embodiment of a mobile device protector or case 100 according to an aspect of the present disclosure. A first section 102 may be operatively connected to a second section 104 by a transitional section 106, forming a clam-shell-like casing. In one embodiment, during installation of the protector on a mobile device, the transitional section 106 may be removed. The first section 102 may include a first tab 108 to facilitate installation of the mobile device case 100 on a mobile device (not shown). The first tab 108 may include perforations for removing the first tab 108 from the mobile device protector/case 100, during or after installation of the protector on the device. The mobile device case 100 may be sized to fit a variety of makes/models of mobile devices. The mobile device case 100 may be customized by a user, or as manufactured, to conform with the placement of features on a particular mobile device.

Figure 2:
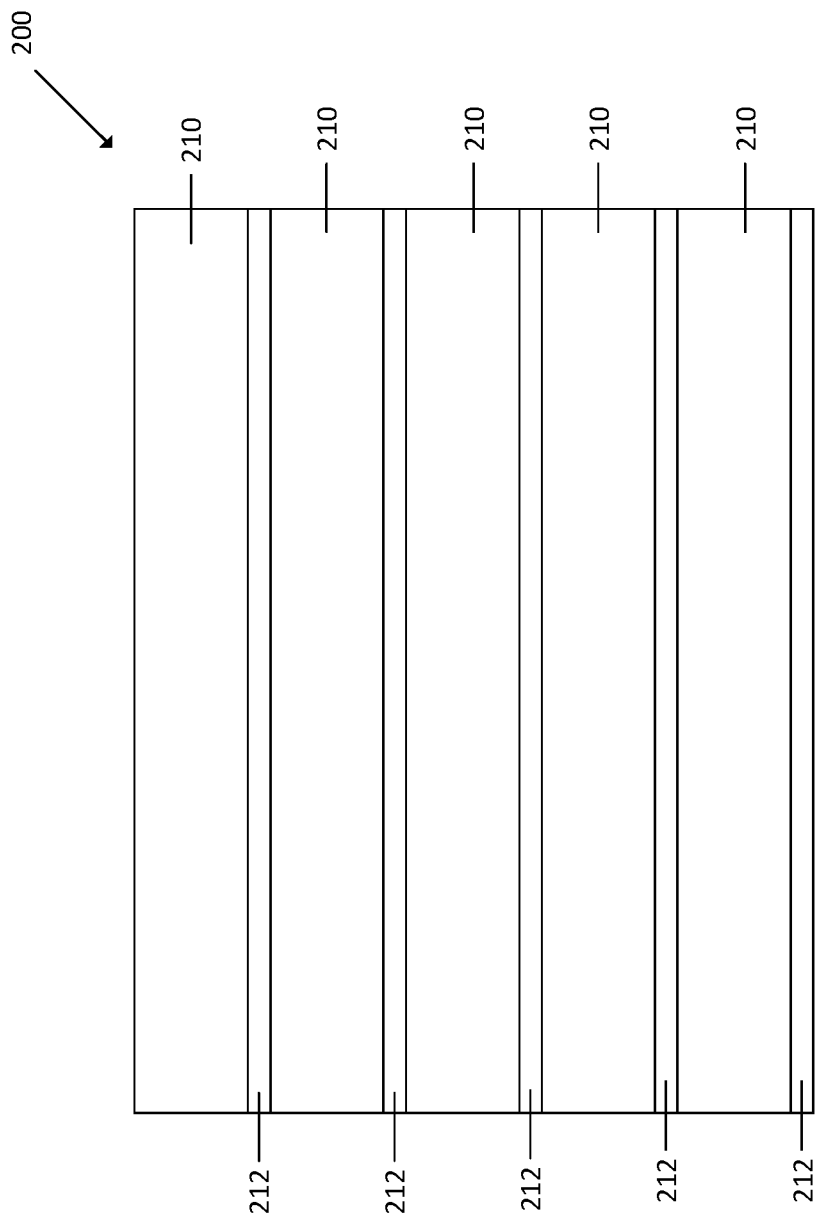
FIG. 2 depicts a side sectioned view of the mobile device protector, taken along a line A-A of FIG. 1.

As illustrated in FIG. 2, the mobile device case 100 may include multiple layers, for example 1-10 layers of material (or 2-10 layers, with 4 to 10 being illustrative as a function of the composition of the material in order to maintain touch-screen capabilities and tactile responsiveness of the device). However, it should be appreciated that although the embodiment describes is discussed as having 2-10 layers, it could be more or fewer layers. Each of the multiple layers 210 of the mobile device case 100 may be formed of a flexible plastic or polymeric material (referred to herein as a "plastic layer") including, but not limited to, Glass Shield Multi-Layer 4/4™ available from Graffiti Shield of Anaheim, CA 92806. The layered material is of a thickness that allows for use of the mobile device touchscreen whether there is one layer of material present or multiple layers, for example 10 peelable plastic layers. The material used for the plastic layer(s) may be transparent and/or scratch resistant. The material may also be cleaned using common cleaning solutions if the user prefers to clean the mobile device case 100 instead of or in addition to disposing of a fouled layer.

An adhesive layer 212 may be disposed between each plastic layer 210, and an adhesive layer 212 may also be used to adhere the mobile device case 100 to the mobile device. It should be appreciated that the adhesive layer between each plastic layer and the adhesive layer adhering the protector to the mobile device may be different adhesives and/or create different coefficients of friction as between the surfaces being adhered. The adhesive is selected to not leave a residue when removed either as between layers or as between the mobile device and a first layer of the protector. The adhesive is selected to provide a strong enough adhesion to securely bond the mobile device case 100 to the mobile device to ensure limited movement therebetween. The adhesive also bonds the plastic layers of the mobile device case 100 to each other. The adhesive is selected to have appropriate adhesive force to hold the mobile device case 100 to the mobile device as well as holding each plastic layer to the adjoining layer(s), but at the same time creating an adhesive force that facilitates ease of a user peeling a layer(s) of the mobile device case 100 off when a layer(s) is fouled.

An exemplary embodiment of the disclosure may include sufficient adhesive disposed between each layer to form a 1:10 to 1:5 thickness ratio of adhesive to plastic layer. Each plastic layer, in an illustrative embodiment, may be 2-4 mil thick. In other words, each plastic layer of the exemplary mobile device case may be 2-4 mil thick and the adhesive layer may be 0.2 to 0.8 mil thick. By way of example, an exemplary embodiment of 10 plastic layers may be 22 to 48 mil thick. As the exemplary embodiment is used, and fouled layers are discarded, the exemplary embodiment will become slimmer throughout use, down to approximately 2.2 mil when one layer remains. It should be appreciated that in order to get appropriate adhesive forces the composition of adhesive may be adjusted and/or a pattern of application of the adhesive layer may be modified (e.g., rather than a full layer of adhesive the adhesive layer may be applied in a stripped, dotted or other pattern that will affect adhesive force).

Figure 3:
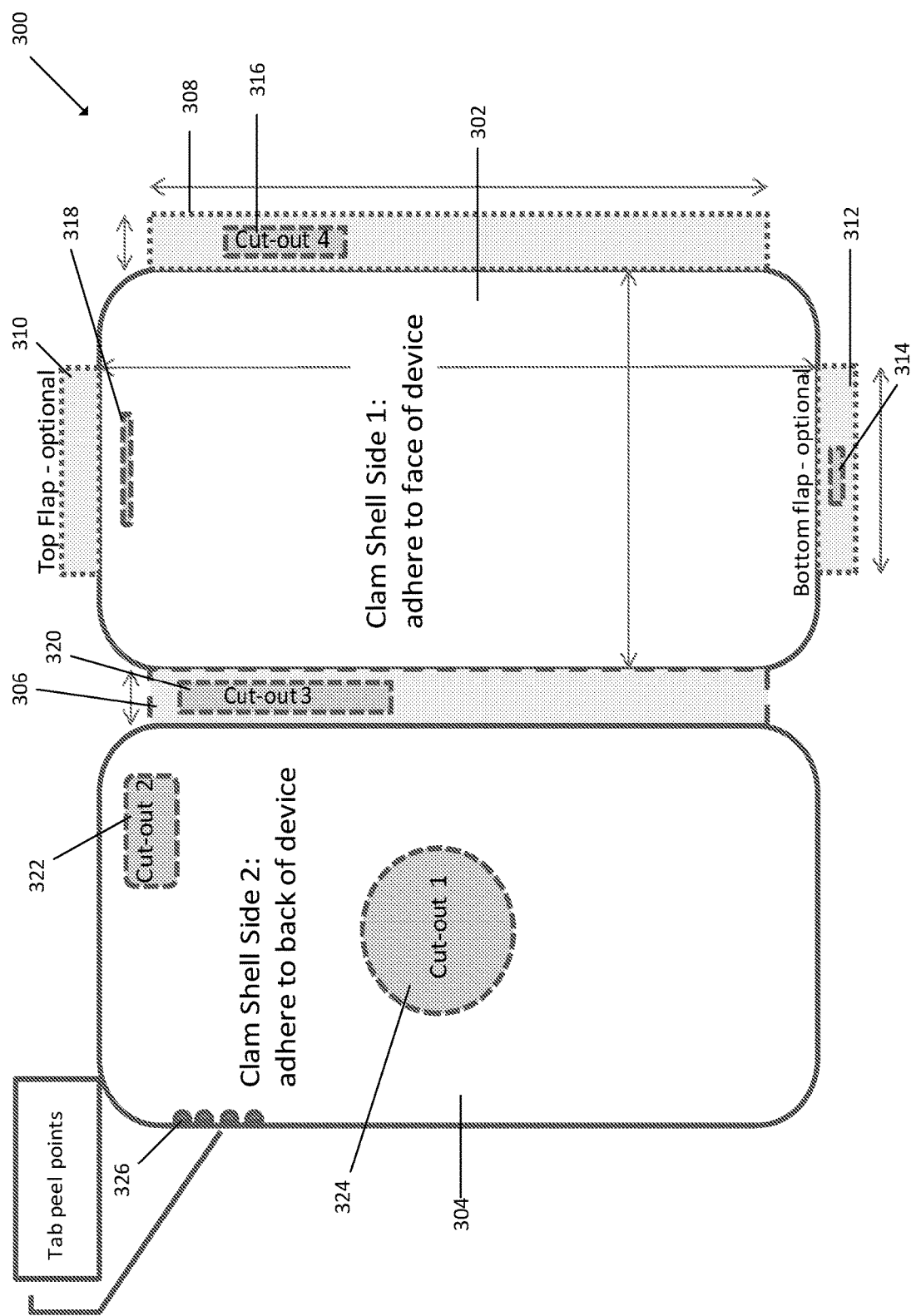
FIG. 3 depicts a second embodiment of the mobile device protector according to further aspects of the present disclosure.

FIG. 3 depicts a second embodiment of the mobile device case 300 according to one aspect of the present disclosure. The device case 300 may include a first device section 302 for covering a first side of a mobile device (not shown), and a second device section 304 for covering a second side of a mobile device (e.g., the opposite side). The first device section 302 and the second device section 304 may be joined or connected by a transitional section 306 operating as a connector between the first section 302 and the second section 304. The transitional section 306 may be formed of the same material as the first section 302 and the second section 304, and as described herein with respect to the embodiment of FIGS. 1 and 2.

At least one perforated tab may be operatively connected to the first section 302. A first tab 308 may be present on the first section 302 of the mobile device case 300. The first tab 308 may assist the user with installing the device case 300 without fouling the case and/or the mobile device. A first flap 310 and a second flap 312 may be present for folding over a first and second edge of the mobile device.

The mobile device case 300 may include at least one perforated section corresponding to the location of at least one feature on the mobile device. The second flap 312 may include a perforated charge port section 314. The charge port section 314 may be removed to allow access to the mobile device charging and audio ports, if present. A perforated power section 316 may be present on the first tab 308. The perforated power section 316 may be removed to provide access to the mobile device's power switch/button (not shown).

A perforated speaker section 318 may be present on the first section 302 of the mobile device case 300. The perforated speaker section 318 may be removed to reduce muffling of audio produced by the mobile device (not shown). A perforated volume section 320 may be present on the transitional section 306 of the mobile device case 300. The perforated volume section 320 may be removed to provide access to volume controls present on the mobile device.

A perforated camera section 322 may be present on the second section 304 of the mobile device case 300. The perforated camera section may be removed to prevent obscuring the mobile device camera (not shown). A perforated cut-out section 324 may be present on the second device section 304 of the mobile device protector case, in order to facilitate placement and adhesion of a device holder (e.g., a pull-out phone holder that sticks to the back of a mobile phone).

The perforated sections described above may be formed as recesses or apertures during formation of the mobile device protector/case 300 in an alternative embodiment without departing from the disclosure. Additionally, the names given to identify the perforated sections are not intended to limit the section to an accompanying feature of a mobile device. By way of example, the perforated volume section 320 may be located by a power button of the mobile device on one make/model of a mobile device, and a volume control on a different make/model of a mobile device without deviating from the scope of the disclosure.

At least one peel or removal tab 326 is provided to facilitate removal of at least one plastic layer from the mobile device protector/case 300 by the user. Each plastic layer (e.g., 210 in FIG. 2) may have a removal tab 326 that is configured to be grasped by the user, and pulled by the user to peel away the plastic layer (and any layers above it). In this embodiment, the removal tabs are extensions from a respective plastic layer, but in alternative embodiments they may be implemented as grippable recesses on a respective layer that can be grasped by the user for removal of one or more layers. The user may remove a top or outermost layer of the mobile device case 300 when the outermost layer is fouled by contamination, scratches, and/or dents/cracks. The user may take hold of the peel tab 326 corresponding to the layer they wish to remove. The user may then apply a force to the peel tab 326 to peel the corresponding layer, and any layers above it (i.e. on a side of the corresponding layer opposing the mobile device), from the mobile device protector/case 300. The mobile device case 300 remains adhered to the mobile device with the remaining layer(s). The removed layer(s) may be disposed of, leaving an uncontaminated mobile device case 300 on the mobile device.

One skilled in the art will appreciate that the embodiments of the mobile device case may be used for multiple makes and models of mobile device, such as those described above. Further embodiments may be configured for other makes/models without departing from the disclosure.

To install the clam-shell protector according to the disclosure, it is removed from its packaging, and a non-stick covering is removed from the first exposed adhesive layer. A mobile device is positioned, face-up or face-down, onto the appropriate device section (front or back section). Any cut-outs may be removed from the protector. Then the protector may be wrapped around an appropriate exposed edge of the device, with the cut-out(s) aligned with any features of the device, and affixed to the appropriate opposite device section (front or back). Light pressure may be applied to the protector to assist with adhesion between the case/protector and the device. Any remaining cut-outs may be further removed.

An exemplary embodiment of a mobile device case/protector may be used in high-contact environments, such as in a medical setting, to improve sanitary conditions. The mobile device case protects a device from damage such as scratches, dings and/or dents during use. Following a consultation with or use by a patient, as an alternative or in addition to using disinfectant wipes to attempt to sanitize the mobile device case, the topmost layer(s) may be removed and disposed of. Any contamination present on the device is removed with the mobile device case layer(s). Beneficially, the layered mobile device protector reduces the need to consume, or expose sensitive persons to, disinfectant supplies to ensure sanitation, and provides multiple modes of protection to the device. Furthermore, because the topmost layer(s) of the mobile device case is disposed of, there is minimal risk of contamination remaining trapped between the case/protector and the mobile device, and/or contamination being transported with the device.

It should be appreciated that the plastic and/or adhesive layers or the device protector according to the disclosure may be configured of a composition that includes an anti-microbial agent. For example, one or both plastic and/or adhesive layers may include an anti-microbial agent on the exterior of the layer or within the layer material to prevent transfer of microbes to a user or spreading via their personal/mobile device(s). For example, an embodiment of the device protector may include an anti-microbial agent, such as non-corrosive antiseptic and or disinfectant agents (e.g., organic acids such as lactic acid, citric acid, antibacterial metal alloys such as copper, herbal antimicrobials such as terpenoids, or the like), on an exterior surface of the plastic layer and/or on or in the adhesive on an adhesive layer, to reduce the transfer of illness-causing microbes to a user and/or communication of the microbes via the user's personal/mobile device(s).

The laminar structure of the device protector may be made of biodegradable materials. The device protector, including the plastic layer(s) and adhesive(s) may include a bio-degradable additive, such as thermo-oxidative treatments, aerobic or anaerobic mechanisms, oxo-biodegradable additives, or the like, for improving the ability of the device protector layers to degrade in the environment, decreasing or eliminating any negative environmental impact of the device protector. Bio-degradable nature of the device protector allows a user to dispose of the each layer, or the entire laminar protector in an environmentally friendly way following use and peeling of one or more layers.

It should be appreciated that the device protector according to the disclosure may be configured completely as a transparent cover so all aspects of the underlying mobile device can be seen through the protector. Alternatively, a protector according to the disclosure may have only transparent portions protecting particular aspects of the device, e.g., the display screen(s), while other components of the protector/case are colored, or translucent (e.g., to protect against sun damage or fading) or decorative with artwork, designs, logos or the like.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

It should be understood that when an element is referred to as being "connected" or "coupled" to another element (or variations thereof), it can be directly connected or coupled to the other element or intervening elements may be present.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration." Any aspect described herein as "illustrative" or "exemplary" is not necessarily to be construed as preferred or advantageous over other aspects.

As used herein, a phrase referring to "at least one of a list of" items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

What is claimed is:

1. A mobile device protector comprising:
a multi-layer peelable case of 2-10 peelable layers formed of a transparent flexible polymeric material, each of the peelable layers including a first device section, a second device section and a transitional section connecting the first device section and the second device section;
the first device section, the second device section, and the transitional section being formed to fit to exterior surfaces of a mobile device on at least two sides of the mobile device;
an adhesive layer disposed on each peelable layer of the multi-layer peelable case of 2-10 peelable layers;
each peelable layer including at least one aperture section corresponding to a location of a feature on the mobile device when the mobile device protector is installed on the mobile device;
a respective removal peel tab formed as a peel tab point recess in each peelable layer, the respective removal peel tab operatively connected to each peelable layer of the multi-layer peelable case of 2-10 peelable layers, each respective removal peel tab formed as at least one recess in the respective peelable layer to receive a force to peel at least one peelable layer of the multi-layer peelable case of 2-10 peelable layers off of an underlying structure in response to a force from a user on the respective removal peel tab.

2. The mobile device protector of claim 1, further comprising an underlying structure that is at least one of the peelable layers of the multi-layer peelable case of 2-10 peelable layers.

3. The mobile device protector of claim 1 further comprising an installation tab.

4. The mobile device protector of claim 3 in which the installation tab is perforated.

5. The mobile device protector of claim 1 in which the transitional section is removable.

6. The mobile device protector of claim 1, in which each peelable layer is transparent and scratch resistant.

7. The mobile device protector of claim 1, in which the adhesive layer adheres the mobile device protector to the mobile device.

8. The mobile device protector of claim 1, in which the adhesive layer between each peelable layer and the adhesive layer adhering the mobile device protector to the mobile device have different coefficients of friction.

9. The mobile device protector of claim 1, in which the adhesive disposed between each peelable layer has a thickness ratio of 1:10 to 1:5 adhesive to each peelable layer.

10. The mobile device protector of claim 1, in which the adhesive layer is applied in a pattern of stripes or dots.

11. The mobile device protector of claim 1, further comprising a first flap for folding over a first edge of the mobile device.

12. The mobile device protector of claim 11, further comprising a second flap for folding over a second edge of the mobile device.

13. The mobile device protector of claim 12, in which the second flap includes at least one of a perforated charge port section, a perforated speaker section, and a perforated camera section.

14. The mobile device protector of claim 1, in which the multi-layer peelable case of 2-10 peelable layers is made of a biodegradable material and has an anti-microbial agent on an exterior layer of the unitary plastic layer.

15. A device protector apparatus, comprising:
a multi-layer peelable case of 2-10 peelable layers formed of a transparent flexible polymeric material, each of the peelable layers including a first device section, a second device section and a transitional section connecting the first device section and the second device section; and
the first device section, the second device section, and the transitional section having an adhesive disposed on at least a portion of at least one of the first device section, the second device section, and the transitional section to adhere to the device on at least two sides of the device;
the first device section, the second device section, and the transitional section comprise a respective one layer of the multi-layer peelable case of 2 to 10 peelable layers, each respective one layer comprising at least one peelable plastic layer and a respective adhesive layer formed of the adhesive; and
a respective removal peel tab formed as a peel tab point recess in each respective one layer of the multi-layer peelable case of 2-10 peelable layers, the peel tab point recess formed as at least one recess in the respective one layer to receive a force to peel the at least one peelable plastic layer of the multi-layer peelable case of 2-10 peelable layers off of an underlying structure in response to a force from a user on the respective removal peel tab.

* * * * *